(12) United States Patent
Gaudin

(10) Patent No.: US 6,843,291 B1
(45) Date of Patent: Jan. 18, 2005

(54) PNEUMATIC TIRE

(75) Inventor: Yves Gaudin, Maillet (FR)

(73) Assignee: The Goodyear Tire & Rubber Company, Akron, OH (US)

( * ) Notice: Subject to any disclaimer, the term of this patent is extended or adjusted under 35 U.S.C. 154(b) by 163 days.

(21) Appl. No.: 10/129,572

(22) PCT Filed: Nov. 6, 2000

(86) PCT No.: PCT/EP00/10932

§ 371 (c)(1),
(2), (4) Date: Aug. 29, 2002

(87) PCT Pub. No.: WO01/34412

PCT Pub. Date: May 17, 2001

(30) Foreign Application Priority Data

Nov. 8, 1999 (FR) .......................................... 99 13980

(51) Int. Cl.$^7$ ............................. B60C 3/04; B60C 3/06; B60C 9/28; B60C 9/30; B60C 11/01

(52) U.S. Cl. ............................. 152/209.8; 152/209.14; 152/209.16; 152/454; 152/455; 152/456; 152/523; 152/538

(58) Field of Search ........................ 152/209.8, 209.14, 152/209.16, 454–456, 523, 538

(56) References Cited

U.S. PATENT DOCUMENTS 3,450,182 A * 6/1969 Verdier ..................... 152/209.8
3,976,115 A * 8/1976 Mirtain et al. ....... 152/209.16 X
4,079,768 A * 3/1978 Verdier .............. 152/209.14 X
4,082,132 A * 4/1978 Arai et al. .............. 152/454 X
4,265,289 A * 5/1981 Pommier ................ 152/456 X
5,591,284 A * 1/1997 Gaudin ................... 152/538 X
5,738,740 A * 4/1998 Cluzel .................... 152/538 X
6,131,632 A * 10/2000 Fukumoto et al. ...... 152/454 X
6,367,527 B1 * 4/2002 Cluzel .................... 152/538 X
6,401,778 B1 * 6/2002 Cluzel .................... 152/538 X

* cited by examiner

*Primary Examiner*—Adrienne C. Johnstone
(74) *Attorney, Agent, or Firm*—Richard B. O'Planick; David L. King

(57) ABSTRACT

A tire comprising a carcass extending through sidewall regions and a ground contacting tread region and a tread reinforcing breaker disposed radially outward of the carcass in the tread region, inboard and outboard tread regions each extending between the tread circumferential centerline (X) and axially spaced-apart inboard and outboard tread edges (IE,OE), the inboard tread edge (IE) for mounting nearest to the vehicle longitudinal centerline, characterised in that in the condition that the tire is mounted on its scheduled wheelrim and inflated to its scheduled pressure, the axial width (LR) of the tread between its tread edges (OE, IE) is not less than 75% of the maximum tire width (G), the axial width (LC) of the breaker is not less than 97% of the tread width (LR) and the difference in the breaker width (LC) and the tread width (LR) is not more than 25% of the difference between the maximum tire width (G) and the tread width (LR).

11 Claims, 3 Drawing Sheets

PNEUMATIC TIRE

TECHNICAL FIELD

The present invention relates to a pneumatic radial tyre and particularly but not exclusively to a heavy duty truck tyre such as may be fitted to a semi-trailer.

Tyres fitted to articulated trucks or semi-trailers can be subjected to severe scrubbing when the vehicle is manoeuvring. Notably tyres on trailers with three rigid axles can be subjected to extremely large side forces when the vehicle is turning on fill steering lock. Such severe forces can cause separation of the rubber from the metal wire at the edge of the tread belt on the interior side nearest to the vehicle centreline whilst premature tread wear is apt to occur at the exterior tread shoulder.

Accordingly it is an object of the present invention to provide a tyre in which the above effects causing breaker edge looseness and excessive tread wear can be mitigated.

DISCLOSURE OF THE INVENTION

According to the invention there is provided a tyre comprising a carcass extending between two wheelrim-contacting bead regions through sidewall regions and a ground contacting tread region and a tread reinforcing breaker disposed radially outward of the carcass in the tread region, the tread region having inboard and outboard tread regions each extending between the tread circumferential centreline and axially spaced-apart inboard and outboard tread edges, the inboard tread edge intended for mounting nearest to the vehicle longitudinal centreline, characterised in that in the condition that the tyre is mounted on its scheduled wheelrim and inflated to its scheduled pressure, the axial width of the tread between its tread edges is not less than 75% of the maximum tyre width, the axial width of the breaker is not less than 97% of the tread width and the difference in the breaker width and the tread width is not more than 25% of the difference between the maximum tyre width and the tread width.

For the purpose of the invention the scheduled wheelrim and scheduled inflation pressure are those specified by various regional organisations such as the European Tyre and Rim Organisation (ETRTO), in the United States the Tire and Rim Association (T&RA) or the Japanese Automobile Tire Manufacturers Association (JATMA).

DESCRIPTION OF DRAWINGS

Further aspects of the invention will become apparent from the following description by way of example only of embodiments in conjunction with the following schematic drawings in which.

MODE FOR CARRYING OUT THE INVENTION

Figure 1:
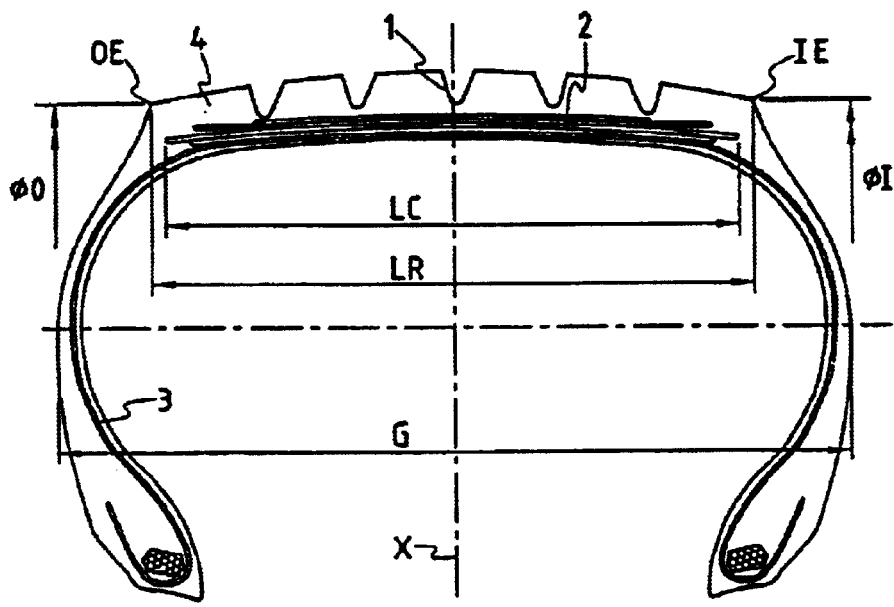
FIG. 1 shows an axial cross-section of a tyre according to a first embodiment of the invention.

The tyre shown in FIG. 1 comprises a carcass ply 3 of radially disposed cords extending between two bead regions through sidewall regions and a ground contacting tread region 1. Radially outward of the carcass ply 3 in the tread region is disposed a reinforcing breaker 2 which in this particular embodiment comprises four individual breaker plies of different axial widths. Each of the breaker plies comprises cord reinforced tyre fabric. The axial width LC of the breaker is the axial distance between the edges of the widest breaker ply.

The breaker extends axially into each of the two shoulder regions of the tread region. In the condition that the tyre is assembled on a wheelrim and mounted on the vehicle, the shoulder 4 lying to the left-side of the tyre central circumferential axis X in FIG. 1 is disposed on the exterior or outboard side, i.e. further from the vehicle longitudinal centreline. Accordingly the tyre has an inboard tread edge IE and an outboard tread edge OE and an axial tread width of LR between these edges.

Figure 4:
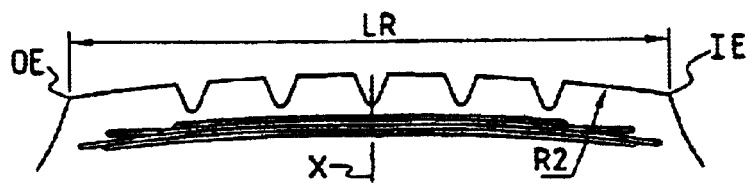
Figure 5:
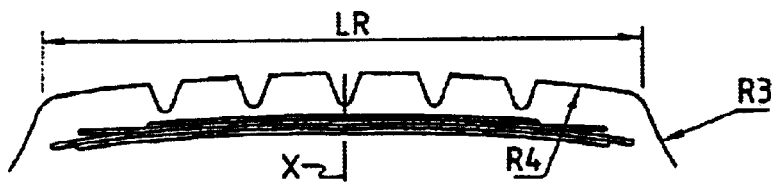

For the purposes of the present invention the tread edge is defined as either the actual intersection of the curve R2 defining the tread shape and the curve R1 defining the sidewall shape as shown in FIG. 4 or the intersection of notional extensions of these curves R4 and R3 as shown in FIG. 5.

In accordance with the present invention when the tyre of FIG. 1 is mounted on its scheduled wheelrim and inflated to its scheduled pressure the axial width LR of the tread is at least 75% of the maximum tyre width G, for example at least 80% and the axial width LC of the breaker is at least 97% of the width LR of the tread for example at least 100%. Furthermore the difference in widths of the breaker 2 and the tread 1 is not greater than 25% of the difference of the tread width LR and maximum tyre width G, for example Dot greater than 15%.

Figure 3:
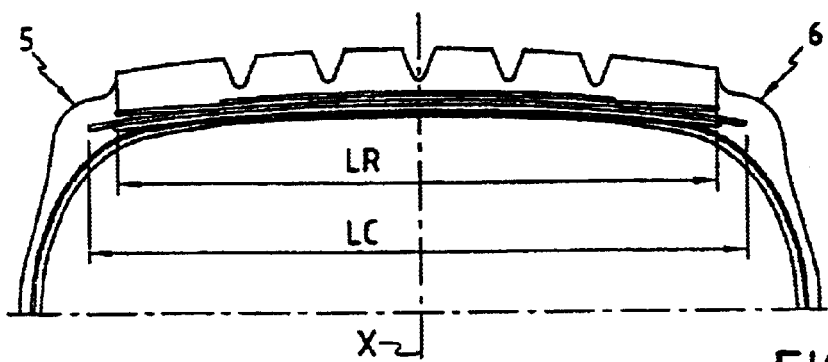
FIGS. 3–10 show an axial cross-section of the tread regions of further embodiments of the invention.
Figure 2:
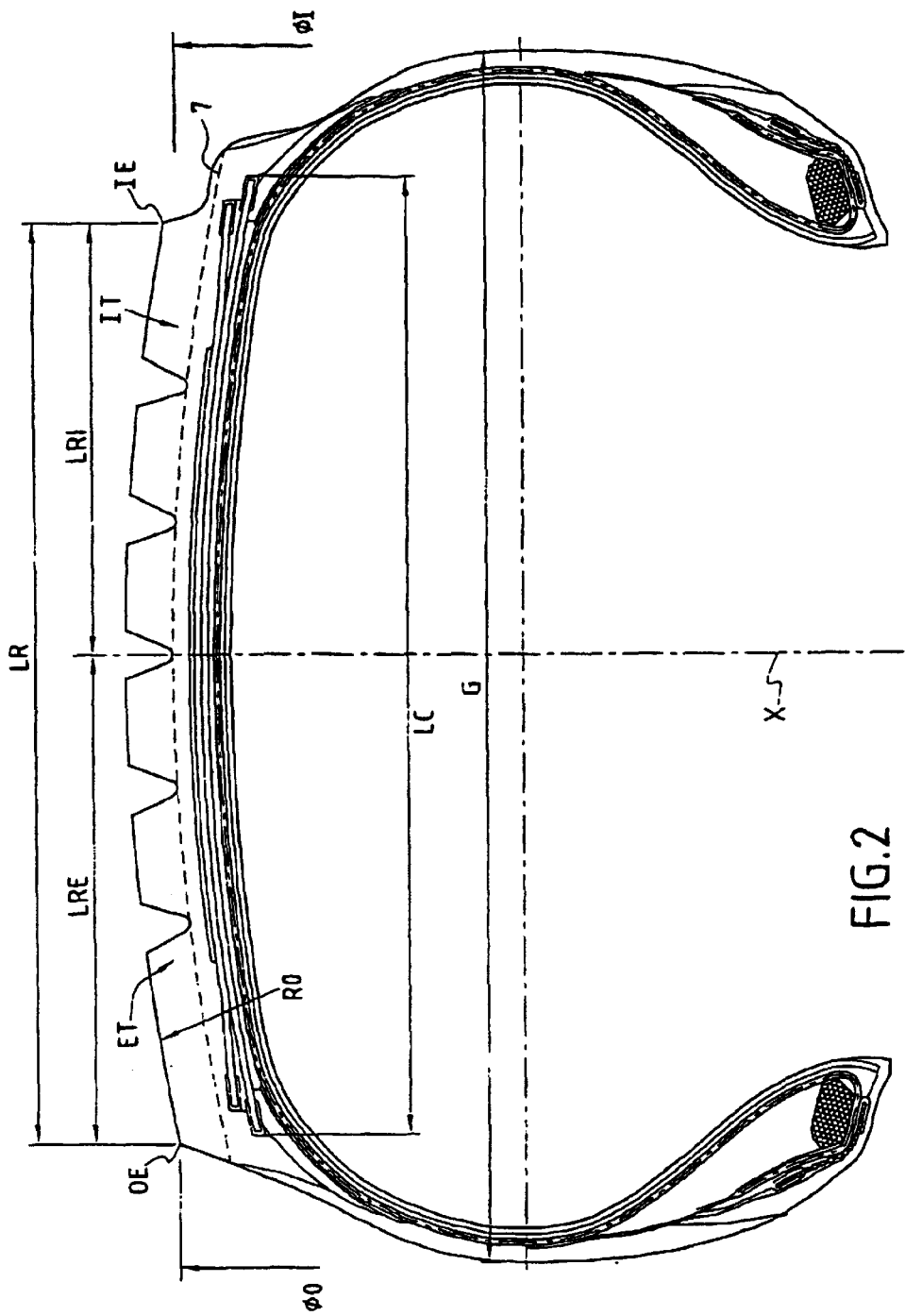
FIG. 2 shows an axial cross-section of another tyre according to a second embodiment of the invention.

Further embodiments of the invention are shown in FIGS. 2 and 3. These tyres have an axially projecting hump 5–7 disposed immediately outwardly adjacent to one or both tread edges IE,OE.

The radially outer surface of the hump 7 or humps 5,6 is radially inward of the tread surface such that the hump does not contact the road surface in normal running of the tyre on the vehicle.

As shown in FIGS. 2 and 3 the breaker may extend beyond the tread edge into the hump.

The tyre of FIG. 2 is a 385/65R22.5 heavy duty truck tyre having a tread width LR of 300 mm and a breaker width LC of 311 mm. In the condition that the tyre is inflated on an 11.75 inch wheelrim inflated to 9 bar its maximum width G is 376 mm. Accordingly the axial width LR of the tread is 80% of the maximum tyre width G, the axial width LC of the breaker is 104% of the tread width and the difference between the breaker width LC and the tread width LR is 14.5% of the difference between the maximum tyre width G and the tread width LR.

As shown the breaker is disposed symmetrically about the tyre central circumferential axis X and extends on the side of the interior or inboard tread IT into a hump 7 disposed adjacent to the inboard tread edge IE. Accordingly the tread of the tyre of FIG. 2 is disposed asymmetrically about the axis X such that the outboard or exterior tread portion ET has a width LRE of 160 mm whilst the inboard or interior tread portion IT has a smaller width LRI of 140 mm.

As mentioned previously for the purpose of this invention the axial width of the breaker is taken as the width of the widest breaker ply which in the case of the tyre of FIG. 2 is the second ply in the radially outward direction. The radially innermost ply has a width of 285 mm, whist the width of the third breaker ply is 295 mm and that of the radially outermost breaker ply is 200 mm.

According to a further aspect of the invention the radially outer surface of the tread axially between the tread edges may be formed as either an arc of a single curvature or may have multiple curvatures.

Figure 6:
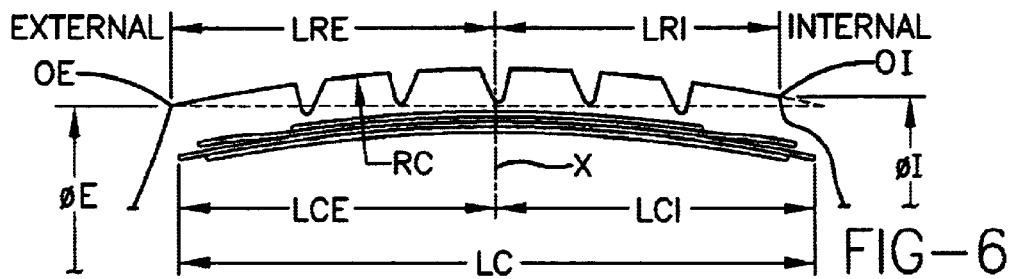

Thus the tyres of FIGS. 1 and 2 have treads formed with a single radius of curvature centered on the central circumferential axis X of the tyre, which in the case of the tyre of FIG. 1 having the tread disposed symmetrically about the axis X results in the diameters ØO and ØI of the outboard and inboard tread edges being equal. In contrast in the tyre of FIG. 2 which has an asymmetric distribution of tread width the diameter ØO of the outboard tread edge OE is smaller than the diameter ØI of the inboard tread edge IE. This configuration is further illustrated in FIG. 6.

Figure 7:
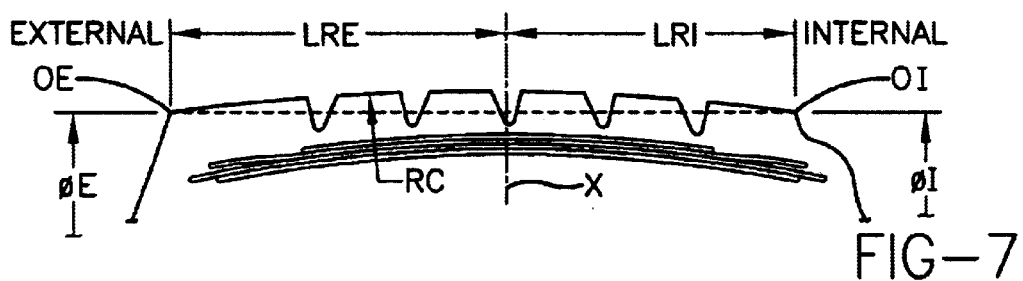

In another configuration the single radius of curvature may be centered off the central circumferential axis X wherein the diameters at the two tread edges may or may not be equal. FIG. 7 illustrates a configuration wherein a single radius of curvature Rc is offset in order to equalise the shoulder diameters of an asymmetrically disposed tread.

Figure 8:
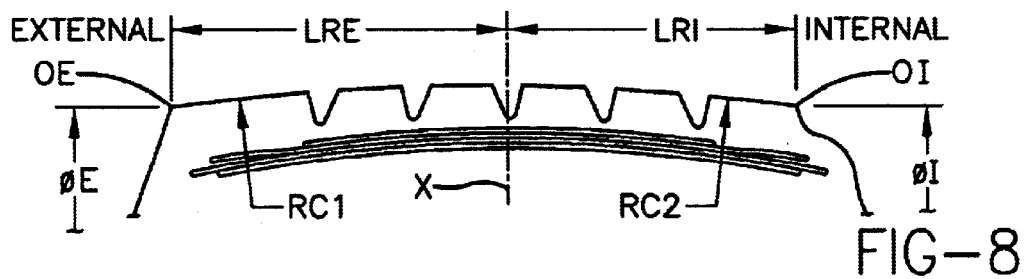

Alternatively the axial tread profile may be formed of a plurality of radii of curvature. FIG. 8 shows a tread having two radii of curvature Rc1 and Rc2 disposed to give identical shoulder diameters ØI,ØO.

Figure 9:
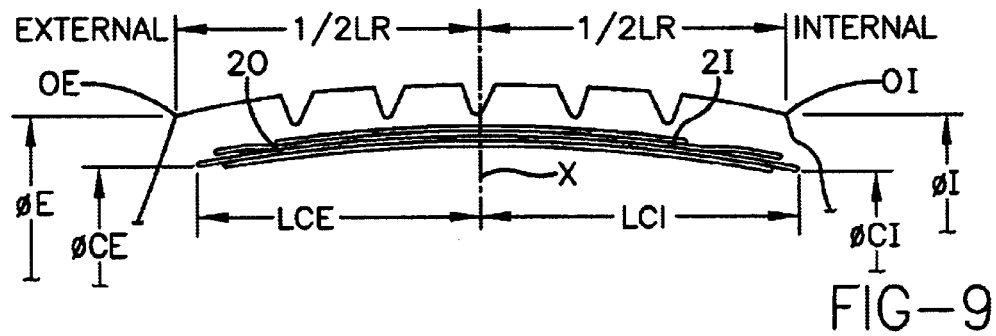
Figure 10:
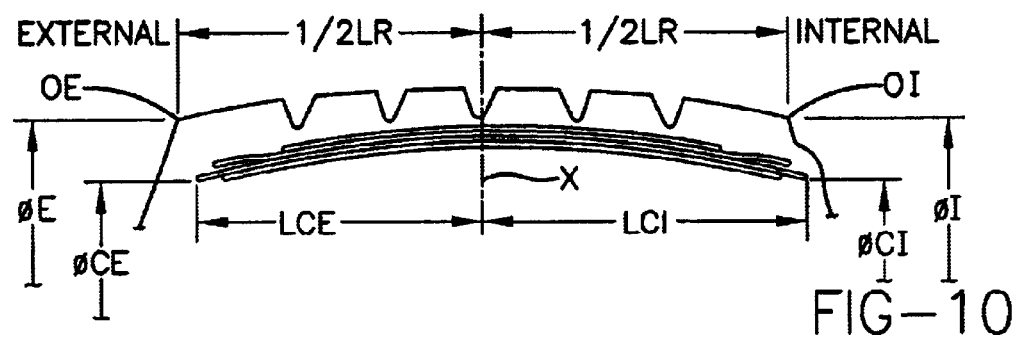

In another configuration according to the invention shown in FIGS. 9 and 10. whilst the ground contacting tread is disposed symmetrically about the tyre circumferential central axis X, the breaker 2 is disposed asymmetrically. In a preferred configuration the breaker portion 21 extending on the inboard side of the axis X has a width LCI which is larger than the width LCE of the portion 20 lying to the outboard side.

In a similar manner as the tread, the axial profile of the breaker may be formed such that the radial diameters øCE and øCI of the outboard and inboard belt edges are either the same as shown in FIG. 10 or such that the inboard edge diameter øCI is smaller than the diameter øCE of the outboard edge as shown in FIG. 9.

Tyre constructions in accordance with the invention benefit from an increased tread and breaker width compared to conventional tyres of the same size designation. Increased tread width has the effect of lowering levels of ground contact pressure which improves tread life by reducing wear.

Further by increasing the width of the belt (2) and of the tread (1) without changing the tyre width, the tyre shoulders are in a zone of reduced stress due to the increase effectiveness of the carcass which restrains this region by its natural equilibrium. Accordingly the effect of the edge which is a source of separation or looseness in the crown of the tyre is minimised as are the concentration of forces compared to the normal tyre structure. This reduced edge effect due to a more natural equilibrium compared to being artificially maintained by the breaker or belt is equally preferable for the benefit of both the structural integrity and the wear characteristics of the tyre tread.

Furthermore in configurations where the edge of the belt or breaker (2) is situated in a hump (5,6) which does not contact the road surface, it is therefore beneficially situation in a region of reduced stress particularly when the tyre is turning or skidding such that the effects on the structure are mitigated.

What is claimed is:

1. A vehicle tyre comprising a carcass extending between two wheelrim-contacting bead regions through sidewall regions and aground contacting tread region and a tread reinforcing breaker disposed radially outward of the carcass in the tread region, the tread region having inboard and outboard tread regions each extending between the tread circumferential centreline (X) and axially spaced-apart inboard and outboard tread edges (IE,OE), the inboard tread edge (IE) for mounting nearest to the vehicle longitudinal centreline, the tyre characterised in that in the condition that the tyre is mounted on its scheduled wheelrim and inflated to its scheduled pressure, the axial width (LR) of the tread between its tread edges (OE,IE) is not less than 75% 80% of the maximum tyre width (G), the axial width (LC) of the breaker is not less than 97% of the tread width (LR) and the difference in the breaker width (LC) and the tread width (LR) is not more than 25% of the difference between the maximum tyre width (G) and the tread width (LR), the tyre in addition characterised in that for the inboard tread edge only, axially outwards in the shoulder region between the tread edge (IE) and the adjacent sidewall, there is an axially Projecting hump (6) having a radially outer surface which is radially inward of the tread surface such that the hump (6) does not contact the ground in use of the tyre and the axial edge of the breaker on the side of the inboard tread edge (IE) is disposded within the hump (6).

2. A tyre according to claim 1, characterised in that the axial width (LC) of the breaker is not less than 100% of the tread width (LR).

3. A tyre according to claim 1, characterised in that the difference between the breaker width (LC) and the tread width (LR) is not more than 15% of the difference between the maximum tyre width (G) and the tread width (LR).

4. A tyre according to claim 1, characterised in that the width of the tread is 80% of the maximum tyre width (G), the axial width (LC) of the breaker is 104% of the tread width (LR) and the difference between the breaker width (LC) and the tread width (LR) is 14.5% of the difference between the maximum tyre width (G) and tread width (LR).

5. A tyre according to claim 1, characterised in that the width (LRE) of the outboard tread portion (ET) lying between the tyre circumferential centreline (X) and the outboard tread edge (OE) is greater than the width (LRI) of the inboard tread portion (IT) lying between the tyre circumferential centreline (X) and the inboard tread edge (IE).

6. A tyre according to claim 1, characterised in that the radial diameter (øI) of the inboard tread edge (IE) is the same as the radial diameter (øO) of the outboard tread edge (OE).

7. A tyre according to claim 6, characterised in that the profile of the radially outer surface of the tread in axial cross-section is defined by an arc of a single radius (RC) having its centre off-set from the plane containing the tread circumferential centreline (X).

8. A tyre according to claim 6, characterised in that the profile of the radially outer surface of the tread in axial cross-section is defined by a plurality of arcs of differing radii (RC1,RC2).

9. A tyre according to claim 1, characterised in that the axial width (LCI) of the breaker portion between the tyre circumferential centreline (X) and the breaker edge on the inboard tread edge side is larger than the axial width (LCE) of the remaining breaker portion lying between the tyre circumferential centreline (X) and the breaker edge on the outboard tread edge side.

10. A tyre according to claim 1, characterised in that the centreline of the breaker in axial cross-section lies along an arc of a single radius of curvature centered in the plane of the tyre circumferential centreline.

11. A tyre according to claim 1, characterised in that the centreline of the breaker in axial cross-section lies along an arc of a single radius of curvature centered outside of the plane containing the tyre circumferential centreline.

* * * * *